(12) United States Patent
Karls

(10) Patent No.: US 12,109,577 B2
(45) Date of Patent: Oct. 8, 2024

(54) HIGH-PRESSURE TOOL, AND METHOD FOR PRODUCING A HIGH-PRESSURE TOOL

(71) Applicant: ECOCLEAN GMBH, Filderstadt (DE)

(72) Inventor: Werner Karls, Vossenack (DE)

(73) Assignee: ECOCLEAN GMBH, Filderstadt (DE)

( * ) Notice: Subject to any disclaimer, the term of this patent is extended or adjusted under 35 U.S.C. 154(b) by 484 days.

(21) Appl. No.: 17/479,074

(22) Filed: Sep. 20, 2021

(65) Prior Publication Data

US 2022/0001401 A1 Jan. 6, 2022

Related U.S. Application Data

(63) Continuation of application No. PCT/EP2020/057783, filed on Mar. 20, 2020.

(30) Foreign Application Priority Data

Mar. 21, 2019 (DE) .......................... 102019107292.1

(51) Int. Cl.
*B05B 1/34* (2006.01)
*B05B 1/20* (2006.01)
(Continued)

(52) U.S. Cl.
CPC .................. *B05B 1/34* (2013.01); *B05B 1/20* (2013.01); *B05B 15/65* (2018.02); *B08B 3/02* (2013.01); *B33Y 80/00* (2014.12)

(58) Field of Classification Search
CPC .. B05B 1/34; B05B 15/65; B05B 1/20; B08B 3/02; B33Y 80/00
(Continued)

(56) References Cited

U.S. PATENT DOCUMENTS 3,080,265 A * 3/1963 Maasberg ................. E03F 9/00
  134/167 C
5,125,425 A * 6/1992 Folts ..................... B08B 9/0433
  239/567

(Continued)

FOREIGN PATENT DOCUMENTS

CN 202290641 7/2012
CN 105817376 8/2016
(Continued)

OTHER PUBLICATIONS

Official Action (with English translation) for Europe Patent Application No. 20714166.4, dated Aug. 23, 2023, 9 pages.
(Continued)

*Primary Examiner* — Steven J Ganey
(74) *Attorney, Agent, or Firm* — Sheridan Ross P.C.

(57) ABSTRACT

The invention relates to a high pressure tool for industrially cleaning and/or machining workpieces by means of a pressurized fluid, wherein the high pressure tool comprises the following:
a base body and a flow channel extending between a flow channel inlet and at least one flow channel outlet. In order to provide a high pressure tool of that kind, with which an improved degree of efficiency can be achieved, it is proposed in accordance with the invention that the high pressure tool further comprises a nozzle body on which the at least one flow channel outlet is arranged and through which the flow channel at least partially extends, wherein the base body comprises or forms the nozzle body or wherein the base body is connected or connectable to the nozzle body.
A method for producing a high pressure tool of that kind is further disclosed.

22 Claims, 6 Drawing Sheets

(51) Int. Cl.
    *B05B 15/65*    (2018.01)
    *B08B 3/02*    (2006.01)
    *B33Y 80/00*    (2015.01)

(58) Field of Classification Search
    USPC ........ 239/461, 518, 526, 524, 548, 567, 589
    See application file for complete search history.

(56) References Cited

U.S. PATENT DOCUMENTS

| | | | | |
|---|---|---|---|---|
| 5,992,432 | A * | 11/1999 | Horger | B05B 1/14 |
| | | | | 134/169 C |
| 6,325,305 | B1 * | 12/2001 | Kuhlman | E21B 37/00 |
| | | | | 239/548 |
| 6,564,868 | B1 * | 5/2003 | Ferguson | E21B 43/114 |
| | | | | 166/55 |
| 2009/0218422 | A1 | 9/2009 | Goring et al. | |
| 2018/0126404 | A1 | 5/2018 | Foshag et al. | |

FOREIGN PATENT DOCUMENTS

| | | |
|---|---|---|
| DE | 102006028393 | 1/2007 |
| DE | 102016205947 | 10/2017 |
| DE | 102016113977 | 2/2018 |
| EP | 2047912 | 4/2009 |
| EP | 1901894 | 11/2010 |
| WO | WO 2010/089165 | 8/2010 |

OTHER PUBLICATIONS

Official Action with machine translation for German Patent Application No. 102019107292.1, dated Apr. 20, 2020, 9 pages.

International Search Report and Written Opinion for International (PCT) Patent Application No. PCT/EP2020/057783, dated Jul. 7, 2020, 13 pages.

English Translation of the International Search Report for International (PCT) Patent Application No. PCT/EP2020/057783, dated Jul. 7, 2020, 2 pages.

International Preliminary Report on Patentability for International (PCT) Application No. PCT/EP2020/057783, dated Sep. 30, 2021, 9 pages.

* cited by examiner

HIGH-PRESSURE TOOL, AND METHOD FOR PRODUCING A HIGH-PRESSURE TOOL

CROSS-REFERENCE TO RELATED APPLICATIONS

This application is a continuation application of international application number PCT/EP2020/057783, filed on Mar. 20, 2020, and claims the benefit of German application number 10 2019 107 292.1, filed on Mar. 21, 2019, which are incorporated herein by reference in their entirety and for all purposes.

FIELD OF THE INVENTION

The present invention relates to a high pressure tool for industrially cleaning and/or machining workpieces by means of a pressurized fluid.

BACKGROUND OF THE INVENTION

A high pressure tool of the kind stated above may be used for cleaning and/or machining workpieces. A cleaning of a workpiece may presently be understood, in particular, to mean a cleaning by means of a pressurized fluid, for example by means of a pressurized gas or, in particular, by means of a pressurized liquid, for example by means of water. A cleaning is presently also understood to mean a removal of particulate contamination of the workpiece. Further, a machining of workpieces, for example a deburring, is possible with the high pressure tool of the kind stated above. Tinsel burrs or root burrs are thus removable, e.g., by machining a workpiece by means of the high pressure tool. Further, surfaces of a workpiece can be roughened (so-called "activation") by machining the workpiece by means of the high pressure tool.

High pressure tools or "high pressure lances" have become known from the prior art, which are composed of a plurality of individual parts, for example of a base body configured as a rotary part, a tubular flow channel body, and a tip that closes the flow channel body. Here, in the prior art, the individual parts are connected to one another by means of welding and/or soldering connections.

A high pressure tool of that kind is known, e.g., from WO 2010/089165 A1 and, in particular, is useable with a switching apparatus disclosed in EP 2 047 912 A1.

An object underlying the present invention is to provide a high pressure tool for industrially cleaning and/or machining workpieces by means of a pressurized fluid, with which high pressure tool an improved degree of efficiency can be achieved and which has an improved durability.

It is a further object underlying the present invention to provide a method for producing a high pressure tool, by means of which the high pressure tool is producible in a simple and cost-effective manner.

SUMMARY OF THE INVENTION

In a first aspect of the invention, a high pressure tool for industrially cleaning and/or machining workpieces by means of a pressurized fluid comprises a base body and a flow channel extending between a flow channel inlet and at least one flow channel outlet. The high pressure tool further comprises a nozzle body formed in one piece, on which the at least one flow channel outlet is arranged and through which the flow channel at least partially extends, wherein the base body comprises or forms the nozzle body or wherein the base body is connected or connectable to the nozzle body.

In a second aspect of the invention, a method for producing a high pressure tool for industrially cleaning and/or machining workpieces by means of a pressurized fluid is provided, wherein the high pressure tool comprises a base body and a flow channel extending between a flow channel inlet and at least one flow channel outlet. The method comprises producing a nozzle body of the high pressure tool, wherein the nozzle body is produced in one piece by means of an additive manufacturing process, such that the at least one flow channel outlet is arranged on the nozzle body and the flow channel extends at least partially through the nozzle body. The method further comprises producing the base body and the nozzle body in one piece in the additive manufacturing process or providing a base body and connecting the base body to the nozzle body.

BRIEF DESCRIPTION OF THE DRAWINGS

The foregoing summary and the following description may be better understood in connection with the drawing figures, of which.

DETAILED DESCRIPTION OF PREFERRED EMBODIMENTS OF THE INVENTION

Figure 1:
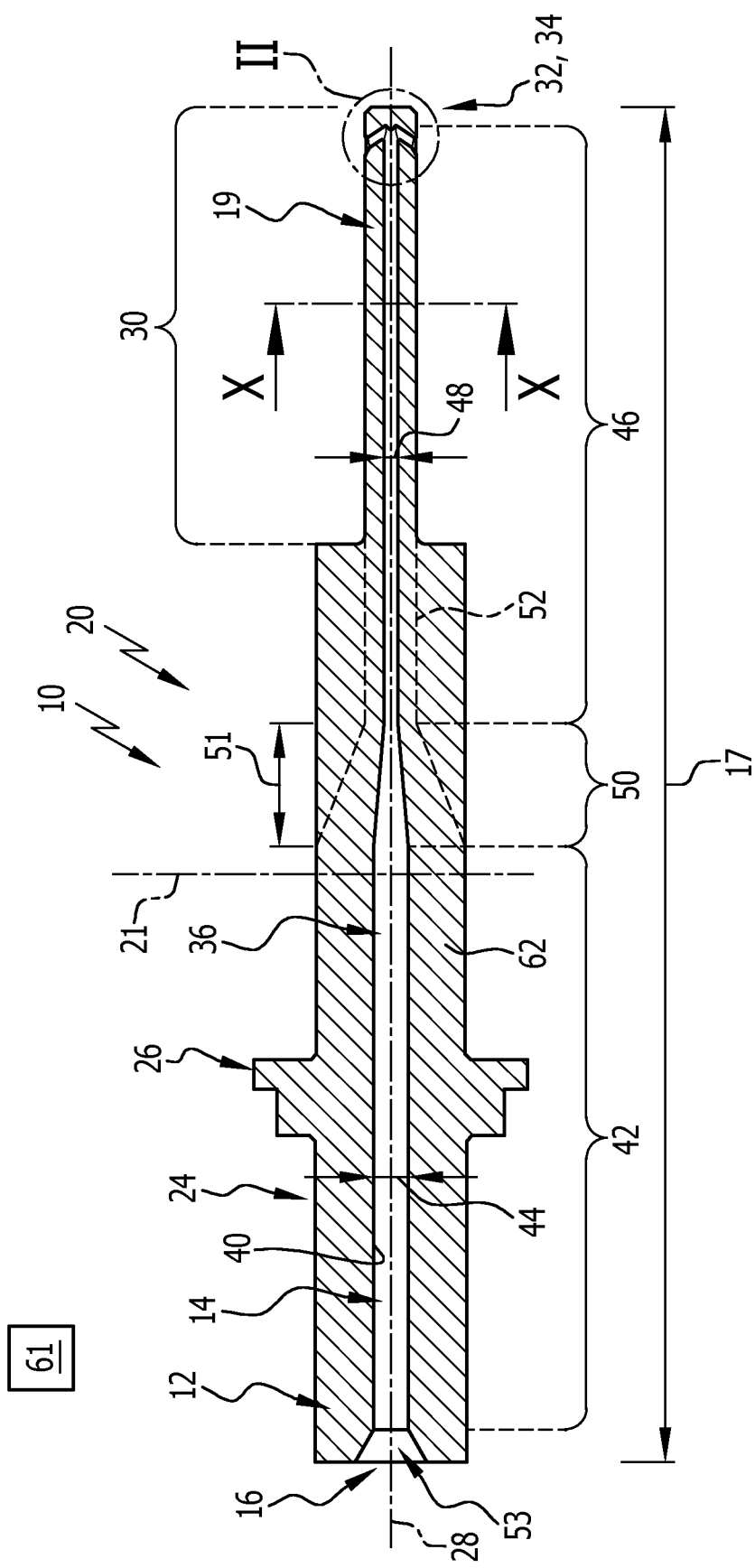
FIG. 1: shows a schematic longitudinal sectional view of a high pressure tool in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a high pressure tool for industrially cleaning and/or machining workpieces by means of a pressurized fluid comprising a base body and a flow channel extending between a flow channel inlet and at least one flow channel outlet, wherein the high pressure tool further comprises a nozzle body formed in one piece, on which the at least one flow channel outlet is arranged and through which the flow channel at least partially extends, wherein the base body comprises or forms the nozzle body or wherein the base body is connected or connectable to the nozzle body.

Workpieces are preferably industrially cleanable and/or machinable by means of the high pressure tool by means of a pressurized fluid, in particular by means of pressurized gas or a pressurized liquid, in particular by a fluid jet of the pressurized fluid being directed at a surface of a workpiece to be cleaned and/or machined. Here, the high pressure tool may preferably be moved relative to the workpiece.

The high pressure tool in accordance with the invention is therefore suitable, in particular, for cleaning and/or machining workpieces of the kind stated at the outset in the field of mechatronics, electronics, and/or made of plastic, in the field of wood or furniture industry or for cleaning generatively manufactured workpieces. The application of the high pressure tool is not limited to this, however. Overall, for example, workpieces made of metal, ceramics, or plastics can be cleaned and/or machined. The workpieces may be, e.g., engine parts or transmission parts, for example cylinder heads, cylinder crankcases, housings, wheels, or shafts. The workpieces may be, e.g., components for electric motors, like, for example, coil bodies, housings, bearings, or shafts. The workpieces may come from the field of medical technology and be implants, for example. The use of the high pressure tool for workpieces made of different materials (hybrid workpieces) is also conceivable. Aside from dry particulate contamination, larger machining residues can also be cleaned off, for example chips, blasting agent, casting core residues or tinsel burrs. Film-like contamination like, e.g., due to cooling lubricant, oils, grease, release agents or abrasives or production residues, for example from plastics processing, can preferably also be removed.

For example, it is conceivable that workpieces are cleanable and/or machinable by means of the high pressure tool with a fluid pressure of at least about 150 bar. For example, workpieces are cleanable and/or machinable by means of the high pressure tool with a fluid pressure in the range of about 150 bar to about 2500 bar, in particular in a range of about 250 bar to about 2000 bar.

For example, water or demineralized water is useable as a cleaning fluid. Here, it is conceivable that the cleaning fluid contains cleaning additives, for example surfactants. It may further be favorable if a cooling lubricant, for example oil, is useable as a cleaning fluid.

It may be favorable if the nozzle body and/or the base body of the high pressure tool are/is integrally formed as one material piece. Within the scope of this description and the accompanying claims, "one material piece" is hereby understood to mean, in particular, that the nozzle body and/or the base body are made entirely of a, preferably homogenous, base material, and/or that no material boundaries are visible in a micrograph of the nozzle body. A micrograph is thereby, in particular, homogenous.

If the base body comprises the nozzle body, provision is preferably made that the base body and the nozzle body are configured as one material piece with one another.

In comparison to the high pressure tools or "high pressure lances" known from the prior art, an improved durability of the high pressure tool can preferably be achieved by providing a nozzle body that is one material piece, because interfaces like, for example, welding or soldering connections can preferably be entirely or at least largely dispensed with.

If the base body is connected or connectable to the nozzle body, provision may be made that the base body is connected or connectable to the nozzle body by force fit, positive engagement and/or material bond.

For example, it is conceivable that the base body is screwed or screwable to the nozzle body. Alternatively or in addition thereto, it is conceivable that the base body is connected to the nozzle body by means of a welding or soldering connection.

If the base body is connected or connectable to the nozzle body, it is conceivable, in particular, that at least a part of the flow channel extends through the base body.

In an embodiment of the high pressure tool, provision is made that the flow channel inlet and the at least one flow channel outlet are arranged entirely on the nozzle body and that the flow channel extends entirely through the nozzle body. For example, it is conceivable that the nozzle body is embedded in the base body of the high pressure tool or is accommodated in the base body of the high pressure tool.

In an embodiment of the high pressure tool, provision is made that the base body is formed as one piece with the nozzle body and in that the flow channel inlet and the at least one flow channel outlet are arranged entirely on the base body.

Here, the high pressure tool consists, in particular, of the base body.

The at least one flow channel outlet of the flow channel preferably forms an outlet nozzle.

For example, it is conceivable that the at least one outlet nozzle is configured as a Laval nozzle. For example, it is conceivable that a cross section of a nozzle channel widens by about 2% to about 5% at a nozzle outlet in the manner of a Laval nozzle.

In an embodiment of the high pressure tool, provision is made that the nozzle body and/or the base body of the high pressure tool are producible or produced by means of an additive manufacturing process.

It may be favorable if the nozzle body and/or the base body are produced by, for example, solidifying a metal powder in layers or melting a metal powder in layers, for example by means of a laser beam.

Due to the production of the nozzle body and/or the base body by means of an additive manufacturing process, contours and radii that are favorable to flow are preferably producible even with a small internal diameter of the flow channel.

Internal edges and/or transitions can thus preferably be designed to be rounded.

As a result of adapting the contours and/or transitions, a pressure loss in the operation of the high pressure tool can preferably be reduced, such that, for example, a pump pressure of a pump unit by way of which the high pressure tool can be acted upon can be reduced.

The high pressure tool is hereby preferably operable with an improved degree of efficiency.

Provision may preferably be made that individual, a plurality of, or all transitions within the flow channel, for example from a supply channel to at least one nozzle channel, are configured with a continuous tangent. Alternatively or in addition, provision may further be made that individual, a plurality of, or all transitions within the flow channel, for example from the supply channel to the at least one nozzle channel, are configured with a non-continuous tangent.

In particular, it is conceivable that a transition from the supply channel to the at least one nozzle channel is of concave, convex, or parabolic configuration, in particular in a cross section taken through a longitudinal axis of the base body.

To avoid turbulent flow losses, it may be favorable if the high pressure tool is operated at a flow speed in the supply channel of at most about 70 m/min, for example at most about 50 m/min.

In one embodiment of the high pressure tool, provision is made that the nozzle body and/or the base body of the high pressure tool are producible or produced by 3D printing.

It may be favorable if the nozzle body and/or the base body are produced by selective laser melting (SLM).

The nozzle body and/or the base body preferably have a base material with a specific density of at least about 99%, preferably at least about 99.8%.

It may be favorable if the flow channel comprises a supply channel and at least one nozzle channel that is fluidically connected to the supply channel, wherein the supply channel and/or the at least one nozzle channel have obtained their final form at least partially, in particular entirely, in an additive manufacturing process, in particular in a 3D printing process.

In one embodiment of the high pressure tool, provision is made that at least a part of the flow channel of the high pressure tool and/or the at least one flow outlet has obtained its final form in a 3D printing process.

For example, it is conceivable that the supply channel has obtained at least a part of its final form in an additive manufacturing process, in particular in a 3D printing process, and that the at least one nozzle channel has obtained its final form entirely in an additive manufacturing process, in particular in a 3D printing process.

Alternatively thereto, it is conceivable that the supply channel and the at least one nozzle channel have each obtained their final form in an additive manufacturing process, in particular in a 3D printing process. In particular, the flow channel has thereby obtained its final form entirely in an additive process, in particular in a 3D printing process.

It is conceivable, in particular, that the nozzle body and/or the base body of the high pressure tool have obtained their respective final form in a 3D printing process.

In one embodiment of the high pressure tool, provision is made that the nozzle body and/or the base body comprise a metallic base material, in particular stainless steel, tool steel, and/or a nickel-based alloy.

The nozzle body and/or the base body consist, in particular, of the metallic base material.

For example, it is conceivable that the nozzle body and/or the base body consist of stainless steel with the material number 1.4404.

It may be further favorable if the nozzle body and/or the base body consist of tool steel with the material number 1.2709.

The tool steel is preferably hardened or not hardened.

It is further possible that the nozzle body and/or the base body consist of a nickel-based alloy, which preferably has the following composition:

| Element | w-% min. | w-% max. |
|---|---|---|
| C | — | 0.08 |
| Mn | — | 0.35 |
| Si | — | 0.35 |

-continued

| Element | w-% min. | w-% max. |
|---|---|---|
| P | — | 0.015 |
| S | — | 0.015 |
| Cr | 17.00 | 21.00 |
| Ni | 50.00 | 55.00 |
| Mo | 2.80 | 3.30 |
| Nb/Cb | 4.75 | 5.50 |
| Ti | 0.65 | 1.15 |
| Al | 0.20 | 0.80 |
| Co | — | 1.00 |
| Ta | — | 0.05 |
| B | — | 0.006 |
| Cu | — | 0.30 |
| Pb | — | 0.0005 |
| Bi | — | 0.00003 |
| Se | — | 0.0003 |
| Fe | Rest | |

In one embodiment of the high pressure tool, provision is made that the flow channel comprises a supply channel and at least one nozzle channel, which branches off of the supply channel and is arranged obliquely to the supply channel.

The flow channel preferably has an at least approximately circular cross section.

The supply channel is formed, in particular, by an inlet opening.

The inlet opening is preferably formed rotationally symmetrical to an axis, for example rotationally symmetrical to a longitudinal axis of the base body.

The inlet opening preferably comprises a first region with a first internal diameter and a second region with a second internal diameter that is smaller than the first internal diameter.

The first internal diameter of the inlet opening is preferably at most about 10 mm, for example at most about 5 mm, in particular at most about 3.5 mm.

The second internal diameter of the inlet opening is preferably at most about 5 mm, for example at most about 1.5 mm, in particular at most about 1.25 mm.

It may be favorable if the first region of the inlet opening is connected to the second region of the inlet opening by means of a transition region.

The transition region of the inlet opening is preferably of frustoconical configuration.

It may be favorable if the inlet opening continuously tapers in the transition region.

It may further be favorable if the transition region of the inlet opening has a length of at least about 10 mm, preferably at least about 15 mm.

Thus, a transition from the first region to the second region of the inlet opening that is particularly favorable to flow can preferably be made possible.

It may be favorable if the at least one nozzle channel is formed by an outlet opening.

The supply channel of the flow channel preferably extends substantially along a longitudinal axis of the base body.

The supply channel of the flow channel is preferably arranged concentrically to the longitudinal axis of the base body.

It may be favorable if the inlet opening comprises an inlet cone at the flow channel inlet.

Edges and/or transitions at a transition from the supply channel to the at least one nozzle channel preferably have a radius of at least about 0.1 mm, preferably at least about 0.2 mm. Edges and/or transitions from the supply channel to the nozzle channels preferably have a radius of at most about 5 mm. For example, it is conceivable that edges and/or transitions from the supply channel to the nozzle channels have a radius in the range of about 0.2 mm to about 1 mm.

The at least one nozzle channel is favorably formed by an outlet opening, which comprises a cylindrical conducting portion, wherein a length of the conducting portion is greater than an internal diameter of the outlet opening in the conducting portion.

The cylindrical conducting portion of the outlet opening is preferably of circular cylindrical configuration.

Alternatively or in addition to a cylindrical conducting portion, provision may be made that the at least one nozzle channel comprises a curved or arcuate conducting portion. Here, it is conceivable, in particular, that a flow cross section of the at least one nozzle channel narrows in the direction of the flow channel outlet.

It may be favorable if the at least one outlet opening comprises an internal diameter in the range of about 0.2 mm to about 3 mm, for example in the range of 0.5 mm to 1.5 mm.

The internal diameter of the inlet opening is preferably greater than the internal diameter of the outlet opening.

In particular, provision may be made that the internal diameter of the inlet opening is adapted to the internal diameter of the outlet opening, for example in dependence on a number of flow channel outlets.

For example, it is conceivable that the supply channel has an hydraulic cross section that, for example, is greater by a factor of at least about 5, for example by a factor of at least about 10, than the sum of the hydraulic cross sections of the nozzle channels.

A longitudinal axis of the outlet opening is preferably aligned at an angle in the range of about 10° to about 30° relative to a longitudinal axis of the inlet opening, for example at an angle of about 15°. A so-called "leading" fluid jet of a pressurized fluid can thereby preferably be produced.

It may further be favorable if a longitudinal axis of the outlet opening is arranged at an angle in the range of about 60° to about 90° relative to a longitudinal axis of the inlet opening.

Alternatively or in addition, it is further possible that a longitudinal axis of the outlet opening is arranged at an angle in the range of about 100° to about 140°, in particular at an angle in the range of about 110° to about 130°, relative to a longitudinal axis of the inlet opening. For example, it is conceivable that a longitudinal axis of the outlet opening is arranged at an angle of about 120° relative to the longitudinal axis of the inlet opening.

The at least one nozzle channel preferably expands, for example in the shape of a funnel, toward the flow channel outlet.

The at least one nozzle channel preferably comprises an outlet funnel, which forms the flow channel outlet.

In one embodiment of the high pressure tool, provision is made that at least one flow channel outlet is arranged on a lateral surface of the nozzle body and/or that at least one flow channel outlet is arranged on an end face of the nozzle body.

It may be favorable, for example, if the high pressure tool comprises at least two flow channel outlets, for example 4 or 6 flow channel outlets.

In particular, it is conceivable that the high pressure tool comprises an even or an odd number of flow channel outlets.

Individual, a plurality of, or all flow channel outlets of the high pressure tool may, for example, be arranged axisymmetrically to a longitudinal axis of the base body on the lateral surface of the nozzle body. Further, it is conceivable that individual, a plurality of, or all flow channel outlets of the high pressure tool are arranged axisymmetrically to a longitudinal axis of the base body on the end face of the nozzle body.

Alternatively, it is conceivable that individual, a plurality of, or all flow channels of the high pressure tool are arranged asymmetrically on the lateral surface and/or on the end face of the nozzle body.

For example, it is conceivable that the high pressure tool comprises two flow channel outlets arranged symmetrically to a longitudinal axis of the base body.

For example, it is further conceivable that two flow channel outlets are arranged on the end face of the nozzle body.

Alternatively or in addition thereto, it is conceivable that two flow channel outlets are arranged on the lateral surface of the nozzle body.

Preferably, additional structures are arranged or formed on a lateral surface of the nozzle body and/or the base body for generating turbulence and/or cavitation in a pressurized fluid, in particular in a fluid space formed between the high pressure tool and a workpiece to be cleaned and/or machined.

An improved cleaning and/or a more effective deburring of a workpiece to be cleaned and/or machined can preferably be made possible by means of the additional structures.

For example, it is conceivable that the additional structures are configured as or comprise projections extending in parallel to a longitudinal axis of the base body of the high pressure tool and projecting away from a lateral surface of the nozzle body or are configured as or comprise recesses in the lateral surface of the nozzle body extending in parallel to the longitudinal axis of the base body.

The projections and recesses may, for example, be of triangular, rectangular, or rounded configuration in a cross section taken perpendicularly to the longitudinal axis of the base body.

In one embodiment of the high pressure tool, provision is made that the nozzle body comprises a flow deflection element, which is arranged coaxially to a longitudinal axis of the base body and is arranged in the flow channel.

For example, provision may be made that the flow deflection element is a projection that projects counter to a flow direction in parallel to the longitudinal axis of the base body, which projection is preferably at least approximately semicircular in a cross section taken through the longitudinal axis of the base body.

Further, it is conceivable that the flow deflection element widens in a wedge-shaped manner in the flow direction. For example, it is conceivable that the flow deflection element is preferably at least approximately wedge-shaped in a cross section of the nozzle body taken through the longitudinal axis of the base body.

The flow channel, in particular the supply channel and/or the at least one nozzle channel, preferably comprises a circular cross section. Further, it is conceivable that cross sections of the flow channel, in particular cross sections of the supply channel and/or of the at least one nozzle channel, may also deviate from a circular shape. Cross sections of the flow channel, in particular cross sections of the supply channel and/or of the at least one nozzle channel, may be of, e.g., oval, lenticular, rectangular, in particular square, triangular, or star-shaped configuration in cross section. In particular, provision may be made that one or more flow channel outlets are of oval, lenticular, rectangular, in particular square, triangular, or star-shaped configuration.

It may further be favorable if the flow deflection element is configured as a projection or recess. A flow deflection element configured as a projection may, for example, be spherical at least in sections. Further, it is conceivable that a flow deflection element configured as a projection is of bell-shaped, conical, frustoconical, or cylindrical configuration.

A transition from the supply channel to the at least one nozzle channel is preferably configured in such a way that a cross section of the flow channel is not reduced by a flow deflection element configured as a projection.

In one embodiment of the high pressure tool, provision is made that the base body comprises a fastening portion, by means of which the high pressure tool is fastenable to a high pressure cleaning apparatus and which comprises a fastening flange.

The fastening flange of the fastening portion preferably projects radially, i.e., in particular perpendicularly to a longitudinal axis of the base body, away from the base body.

It may be favorable if the high pressure tool is rotatably driveable in the region of the fastening portion of the base body, for example by means of a belt drive or a direct drive of a high pressure cleaning apparatus.

For example, provision may be made that the base body at the fastening portion is of circular cylindrical configuration at least in sections, such that the base body is rotatably driveable by means of a belt drive or a direct drive. The high pressure tool can hereby be set into rotation about a longitudinal axis of the base body.

In one embodiment of the high pressure tool, provision is made that the high pressure tool comprises an insertion portion for inserting into a recess of a workpiece to be cleaned and/or machined, said insertion portion comprising a cleaning tip, the at least one flow channel outlet being arranged at the cleaning tip.

The cleaning tip forms, in particular, a free end of the high pressure tool.

It may be favorable if the nozzle body comprises or forms the insertion portion.

In the region of the insertion portion, the nozzle body preferably has an external diameter of at most about 10 mm, for example at most about 5 mm, in particular at most about 3.5 mm.

The supply channel, in particular the inlet opening, preferably extends substantially entirely through the fastening portion of the base body and through the insertion portion.

In one embodiment of the high pressure tool, provision is made that the base body of the high pressure tool is formed substantially rotationally symmetrical to a longitudinal axis of the base body.

The base body of the high pressure tool is preferably not formed rotationally symmetrical only in the region of the cleaning tip of the insertion portion.

The present invention further relates to a method for producing a high pressure tool of the kind stated at the outset.

Underlying the present invention is the further object of providing a method for producing a high pressure tool of the kind stated at the outset, by means of which the high pressure tool is producible in a simple and cost-effective manner.

This object is achieved in accordance with the invention by a method for producing a high pressure tool of the kind stated at the outset, wherein the high pressure tool comprises a base body and a flow channel extending between a flow channel inlet and at least one flow channel outlet, wherein the method comprises the following: producing a nozzle body of the high pressure tool, wherein the nozzle body is produced in one piece by means of an additive manufacturing process, such that the at least one flow channel outlet is arranged on the nozzle body and the flow channel extends at least partially through the nozzle body; producing the base body and the nozzle body in one piece in the additive manufacturing process or providing a base body and connecting the base body to the nozzle body.

The method in accordance with the invention for manufacturing a high pressure tool preferably has individual or a plurality of the features and/or advantages described in conjunction with the high pressure tool in accordance with the invention. Advantageous embodiments of the method in accordance with the invention result from advantageous embodiments of the high pressure tool in accordance with the invention, such that reference can be made to the preceding statements in this regard.

The nozzle body and/or the base body are favorably produced by 3D printing.

The nozzle body and/or the base body are preferably produced by selective laser melting (SLM).

In one embodiment of the method, provision is made that the nozzle body and/or the base body is produced from a metallic base material, in particular stainless steel, tool steel, and/or a nickel-based alloy.

Figure 10:
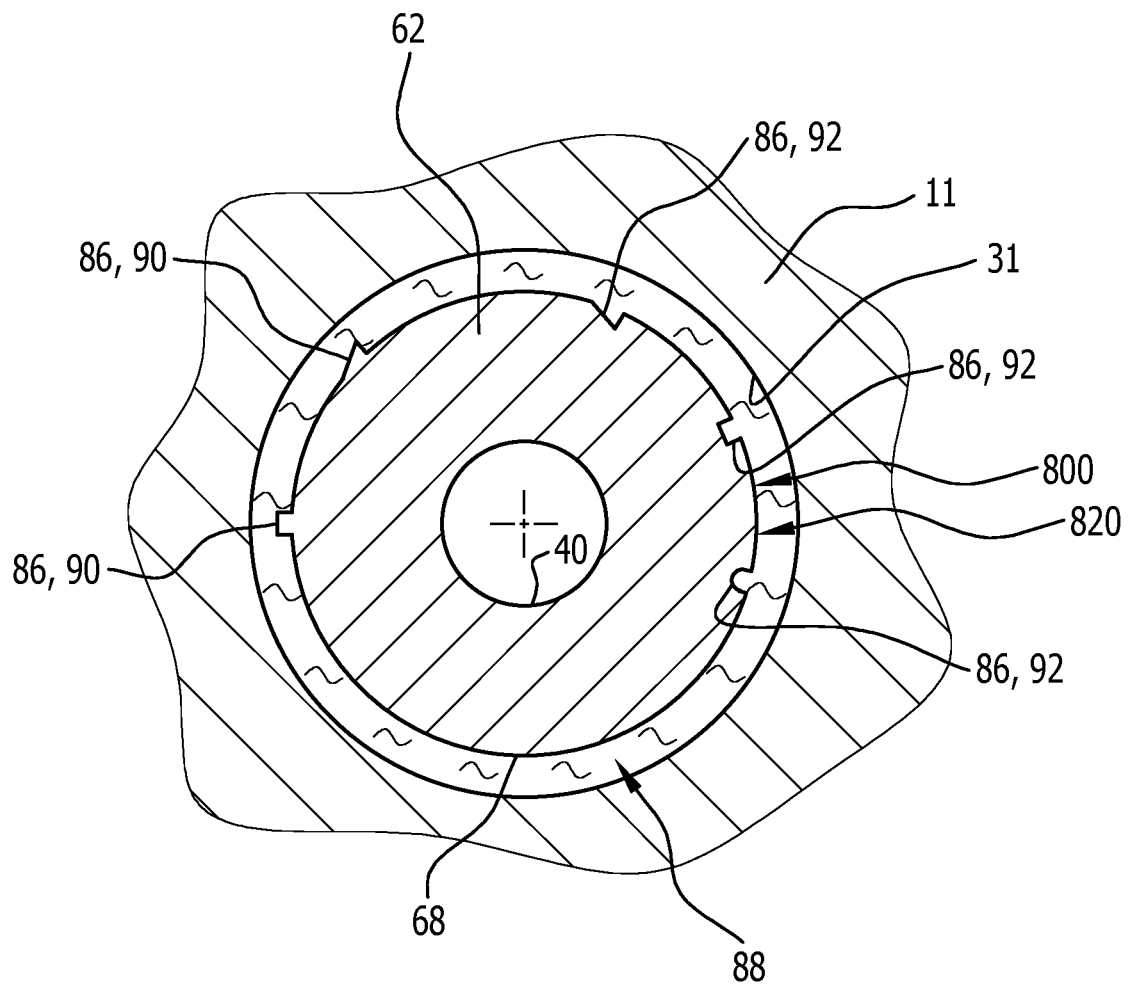
FIG. 10: shows a schematic sectional view along the line X-X in FIG. 1 through a further embodiment of the high pressure tool in accordance with the invention, wherein the high pressure tool is arranged at least partially within a workpiece to be cleaned and/or machined.

FIG. 1 shows in a schematic longitudinal sectional depiction an advantageous embodiment, denoted with the reference numeral 10, of a high pressure tool in accordance with the invention, with which a workpiece 11 that is depicted only in FIG. 10 can be cleaned and/or machined by means of a pressurized fluid, in particular by means of a cleaning fluid. The high pressure tool 10 comprises a base body 12 and a flow channel 14, which extends between a flow channel inlet 16 and a plurality of, in particular two, flow channel outlets 18. The flow channel 14 has, e.g., an at least approximately circular cross section.

The high pressure tool 10 may have a length 17 in the range of about 100 mm to about 2000 mm, for example a length of about 1000 mm.

For example, water or demineralized water is useable as a fluid, in particular as a cleaning fluid. Here, it is conceivable that the fluid contains cleaning additives, for example surfactants. It may further be favorable if a cooling lubricant, for example oil, is useable as a fluid, in particular as a cleaning fluid.

The high pressure tool 10 further comprises a nozzle body 19 formed in one piece, on which the plurality of, in particular the two, flow channel outlets 18 are arranged and through which the flow channel 14 at least partially extends.

The nozzle body 19 is formed in one material piece.

It is hereby conceivable that the base body 12 comprises or forms the nozzle body 19, such that the base body 12 is formed in one piece, in particular one material piece, with the nozzle body 19. Here, the high pressure tool 10 preferably consists of the base body 12, such that the flow channel inlet 16 and the flow channel outlets 18 are arranged entirely on the base body 12 and formed therein.

It is further possible that the base body 12 is connected or connectable to the nozzle body 19, in particular in a connecting region, which is merely schematically depicted in FIG. 1 and is denoted with the reference numeral 21.

If the base body 12 is connected or connectable to the nozzle body 19, provision may be made that the base body 12 is connected or connectable to the nozzle body 19 by force fit, positive engagement and/or material bond. For example, it is hereby conceivable that the base body 12 is screwed or screwable to the nozzle body 19. Alternatively or in addition to a screw connection, it is conceivable that the base body 12 is connected to the nozzle body 19 by means of a welding or soldering connection.

If the base body 12 is connected or connectable to the nozzle body 19, it is conceivable, in particular, that at least a part of the flow channel 14 extends through the base body 12.

For example, workpieces are cleanable and/or machinable by means of the high pressure tool 10 with a fluid pressure of at least about 150 bar. For example, it is conceivable that workpieces are cleanable and/or machinable by means of the high pressure tool 10 with a fluid pressure in the range of about 150 bar to about 2500 bar. It may be favorable, in particular, if workpieces are cleanable and/or machinable by means of the high pressure tool with a fluid pressure in the range of about 250 bar to about 2000 bar. The high pressure tool 10 hereby forms, in particular, a high pressure lance 20, wherein the flow channel outlets 18 form outlet nozzles 22 of the high pressure tool 10.

The base body 12 preferably comprises a fastening portion 24, by means of which the high pressure tool 10 is fastenable to a high pressure cleaning apparatus and which comprises a fastening flange 26 that projects radially, in particular perpendicularly to a longitudinal axis 28 of the base body 12, away from the base body 12.

It is conceivable that the connecting region 21, in contrast to its position depicted in FIG. 1, is arranged further to the left or further to the right in the direction of the longitudinal axis 28 of the base body 12. For example, it is conceivable that an axial distance of the connecting region 21 to the flow channel outlets 18 is smaller than in FIG. 1.

The high pressure tool 10 is rotatably driveable in the region of the fastening portion 24, for example by means of a belt drive of a high pressure cleaning apparatus, which is not graphically depicted. The high pressure tool 10 can hereby be set into rotation about the longitudinal axis 28 of the base body 12.

Figure 9:
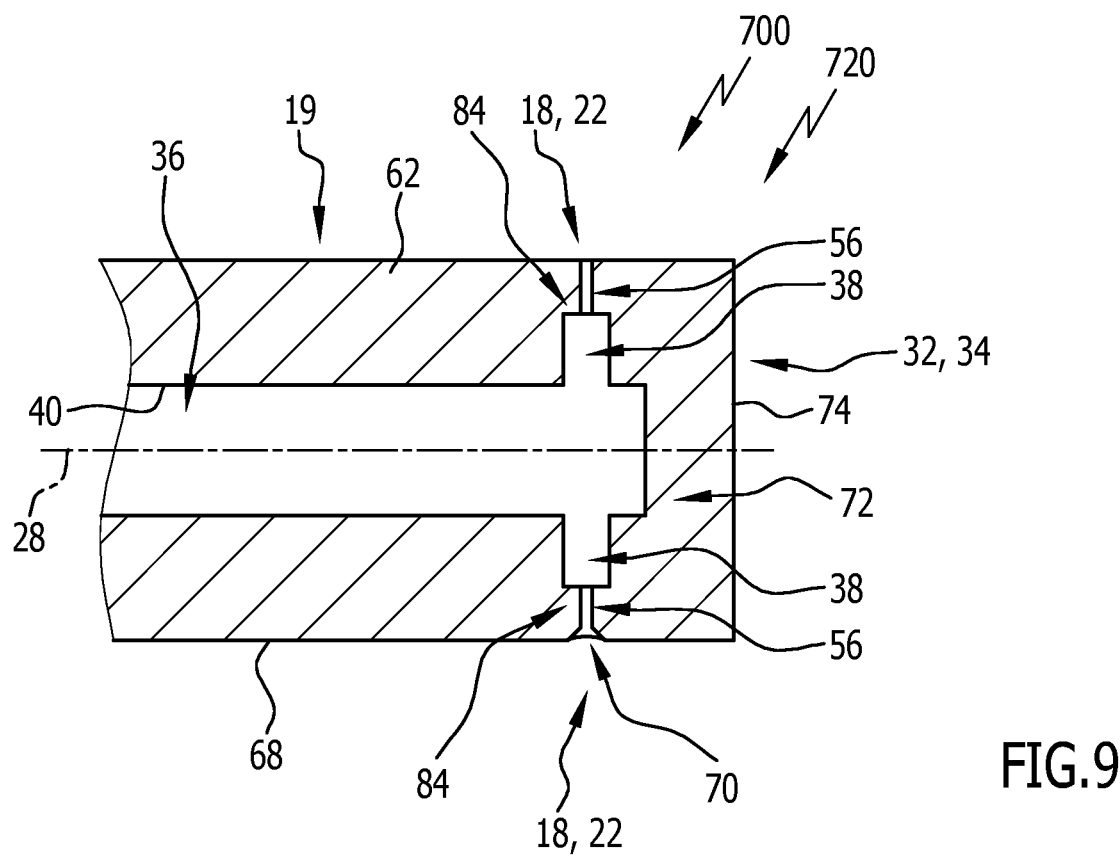
FIG. 9: shows an enlarged depiction, corresponding to FIG. 2, of a further embodiment of the high pressure tool in accordance with the invention.

The high pressure tool 10 preferably further comprises an insertion portion 30 for inserting into a recess 31, depicted for example in FIG. 9, of a workpiece 11 to be cleaned and/or machined. The insertion portion 30 preferably comprises a cleaning tip 32. As can be seen, e.g., in FIG. 2, the flow channel outlets 18 are arranged, in particular, on the cleaning tip 32.

Here, it is conceivable that the nozzle body 19 comprises or forms the insertion portion 30.

The cleaning tip 32 forms, in particular, a free end 34 of the high pressure tool 10 in the assembled state thereof.

In the region of the insertion portion 30, the nozzle body 19 preferably has an external diameter of at most about 10 mm, for example at most about 5 mm, in particular at most about 3.5 mm.

The base body 12 of the high pressure tool 10 is preferably formed substantially rotationally symmetrical to the longitudinal axis 28 of the base body 12 and is not formed rotationally symmetrical, for example, only in the region of the cleaning tip 32 of the insertion portion 30.

The flow channel 14 of the high pressure tool 10 preferably comprises a supply channel 36 and two nozzle channels 38 branching off of the supply channel 36. The nozzle channels 38 are arranged obliquely to the supply channel 36.

The supply channel 36 of the flow channel 14 extends substantially along the longitudinal axis 28 of the base body 12 and is preferably arranged concentrically to the longitudinal axis 28 of the base body 12.

The supply channel 36 is formed by an inlet opening 40. The inlet opening 40 is formed, e.g., rotationally symmetrical to the longitudinal axis 28 of the base body 12.

The inlet opening 40 preferably comprises a first region 42 with a first internal diameter 44. The inlet opening 40 preferably further comprises a second region 46 with a second internal diameter 48 that is smaller than the first internal diameter 44.

The first internal diameter 44 of the inlet opening 40 is preferably at most about 10 mm, for example at most about 5 mm, in particular at most about 3.5 mm. The second internal diameter 48 of the inlet opening 40 is preferably at most about 5 mm, for example at most about 1.5 mm, in particular at most about 1.25 mm.

The first region 42 of the inlet opening 40 is preferably connected to the second region 46 of the inlet opening 40 by means of a transition region 50. The transition region 50 of the inlet opening 40 is of frustoconical configuration, the inlet opening 40 tapering, preferably continuously, in the transition region 50.

The transition region 50 of the inlet opening 40 preferably has a length 51 of at least about 10 mm, preferably at least about 15 mm, such that a transition from the first region 42 to the second region 46 of the inlet opening 40 can be made possible that is particularly favorable to flow.

It may be favorable if a wall thickness of the high pressure tool 10, for example a wall thickness of the base body 12 and/or the nozzle body 19, varies in the direction of the longitudinal axis 28 of the base body 12 in dependence on the pressure prevailing in the flow channel 14 in the operation of the high pressure tool 10. It is thus conceivable, for example, that a wall thickness of the high pressure tool 10 decreases over the length 51 of the transition region 50, which is depicted, in particular, in FIG. 1 by a dashed line.

The inlet opening 40 preferably comprises an inlet cone 53 at the flow channel inlet 16.

The nozzle channels 38 are preferably each formed by an outlet opening 54.

The outlet openings 54 preferably each comprise a cylindrical conducting portion 56. A length 58 of the conducting portion 56 is preferably greater than an internal diameter 60 of the outlet opening 54 in the conducting portion 56.

A fluid jet exiting the flow channel outlets 18 can thus preferably be directed in a particularly reliable manner.

The conducting portion 56 of the outlet openings 54 is, e.g., in each case of circular cylindrical configuration.

If the outlet openings 54 have a circular cross section, provision may be made that the outlet openings 54 each have an internal diameter 60 in the range of about 0.2 mm to about 3 mm, for example in the range of 0.5 to 1.5 mm. The internal diameter 60 of the outlet openings 54 and a hydraulic cross section of the nozzle channels may vary in dependence on a number of the outlet openings 54 and the nozzle channels 38, respectively.

The second internal diameter 48 of the inlet opening 40 is preferably greater than the internal diameter 60 of the outlet openings 54. The second internal diameter 48 of the inlet opening 40 is, in particular, adapted to the internal diameter 60 of the outlet openings 54, in dependence on a number of flow channel outlets 18 or nozzle channels 38.

For example, it is conceivable that the supply channel 36 has a hydraulic cross section that, for example, is greater by a factor of at least about 5, for example by a factor of at least about 10, than the sum of the hydraulic cross sections of the nozzle channels 38.

The base body 12 of the high pressure tool 10 is preferably produced by means of an additive manufacturing process, for example by solidifying or melting a metal powder in layers. Here, it is conceivable that the base body 12 of the high pressure tool 10 is produced by 3D printing, in particular by selective laser melting (SLM). Preferably, particularly high specific densities can be achieved by selective laser melting.

FIG. 1 shows schematically a 3D printer, denoted with the reference numeral 61, for producing the base body 12.

The nozzle body 19 and/or the base body 12 preferably consist of a metallic base material 62, for example stainless steel, tool steel, or a nickel-based alloy. The metallic base material 62 of the nozzle body 19 and/or the base body 12 preferably has a specific density of at least about 99%, preferably at least about 99.8%.

The nozzle body 19 and/or the base body 12 and, in particular, the flow channel 14 of the high pressure tool 10 have obtained their respective final form preferably in a 3D printing process.

As a result of the production of the nozzle body 19 and/or the base body 12 by means of an additive manufacturing process, contours and/or radii that are favorable to flow are preferably producible even with a small internal diameter 44, 48 of the flow channel 14. Internal edges and/or transitions can thus preferably be designed to be rounded, such that a pressure loss in the operation of the high pressure tool 10 can be reduced and the high pressure tool 10 is operable with an improved degree of efficiency.

For example, it is conceivable that edges and/or transitions at a transition from the supply channel 36 to the nozzle channels 38 have a radius of at least about 0.1 mm, preferably of at least about 0.2 mm. Edges and/or transitions from the supply channel 36 to the nozzle channels 38 preferably have a radius of at most about 5 mm. For example, it is conceivable that edges and/or transitions from the supply channel 36 to the nozzle channels 38 have a radius in the range of about 0.2 mm to about 1 mm.

Figure 2:
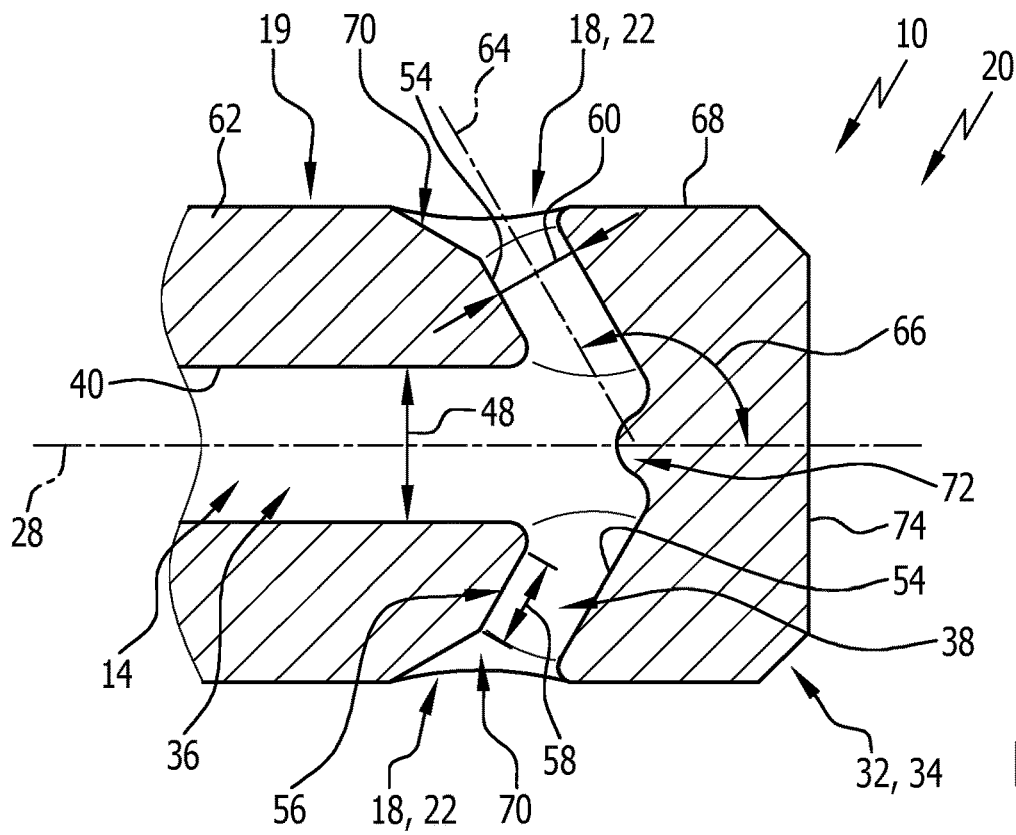
FIG. 2: shows an enlarged depiction of the region II in FIG. 1.

In the embodiment of the high pressure tool 10 depicted in FIGS. 1 and 2, a longitudinal axis 64 of the outlet opening 54 is arranged at an angle 66 in the range of about 100° to about 140°, in particular at an angle 66 in the range of about 110° to about 130°, relative to the longitudinal axis 28 of the inlet opening 40. The longitudinal axis 64 of the outlet opening 54 is presently arranged at an angle 66 of about 120° relative to the longitudinal axis 28 of the inlet opening 40.

The flow channel outlets 18 are hereby arranged on a lateral surface 68 of the nozzle body 19.

As can be seen, in particular, in FIG. 2, the nozzle channels 38 each expand in the shape of a funnel toward the flow channel outlet 18. The nozzle channels 38 hereby comprise an outlet funnel 70, which forms the flow channel outlet 18.

The flow channel outlets 18 of the high pressure tool 10 are preferably arranged symmetrically to the longitudinal axis 28 of the base body 12.

In order to be able to reliably conduct a fluid flowing through the flow channel 14 from the supply channel 36 into the nozzle channels 38, the base body 12 preferably comprises a flow deflection element 72 arranged coaxially to the longitudinal axis 28 of the base body 12, which flow deflection element 72 is arranged in the flow channel 14.

In the embodiment of the high pressure tool 10 depicted in FIGS. 1 and 2, the flow deflection element 72 is preferably configured as a projection that projects counter to a flow direction in parallel to the longitudinal axis 28 of the base body 12. Said projection is of at least approximately semi-circular configuration in a cross section taken through the longitudinal axis 28 of the base body 12.

It may be favorable if a cross section of the flow channel 12 is not reduced at a transition from the supply channel 36 to the nozzle channels 38 by the flow deflection element 72 configured as a projection.

Figure 3:
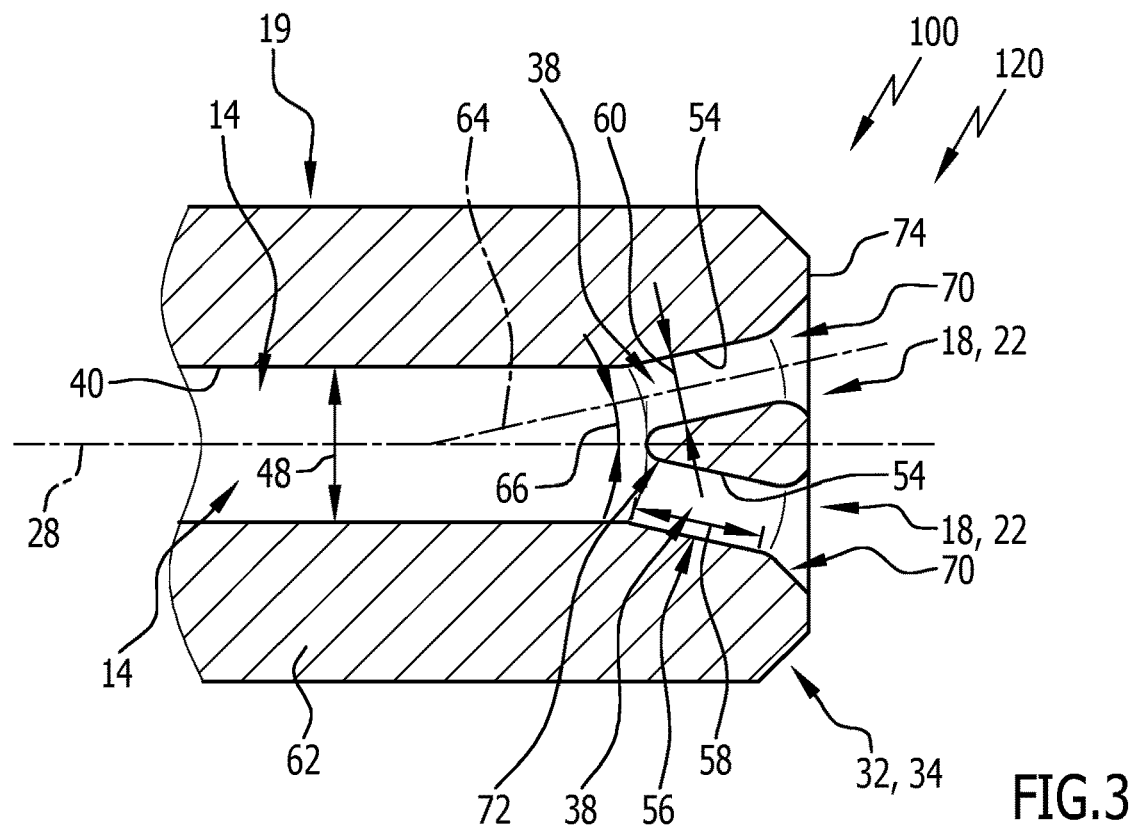
FIG. 3: shows an enlarged depiction, corresponding to FIG. 2, of a further embodiment of the high pressure tool in accordance with the invention.

The embodiment of the high pressure tool partially depicted in FIG. 3 and denoted with the reference numeral 100, which embodiment also forms a high pressure lance 120, differs from the embodiment of the high pressure tool 10 depicted in FIGS. 1 and 2 substantially in that the longitudinal axis 64 of the outlet openings 54 are arranged at an angle in the range of about 10° to about 30° relative to the longitudinal axis 28 of the inlet opening 40. The longitudinal axes 64 of the outlet openings 54 are presently arranged at an angle of about 15° to the longitudinal axis 28 of the inlet opening 40, such that a so-called "leading" fluid jet of a pressurized fluid can be generated.

The flow channel outlets 18 are hereby arranged on an end face 74 of the nozzle body 19.

In order to be able to conduct a fluid flowing through the flow channel 14 from the supply channel 36 into the nozzle channels 38, the nozzle body 19 of the embodiment of the high pressure tool 100 depicted in FIG. 3 preferably comprises a flow deflection element 72, which widens in the shape of a wedge in the flow direction. The flow deflection element 72 is hereby of at least approximately wedge-shaped configuration in a cross section of the nozzle body 19 taken through the longitudinal axis 28 of the base body 12.

In all other respects, the embodiment of the high pressure tool 100 depicted in FIG. 3 corresponds with the embodiment of the high pressure tool 10 depicted in FIGS. 1 and 2, such that reference is made to the preceding description thereof in that regard.

Figure 4:
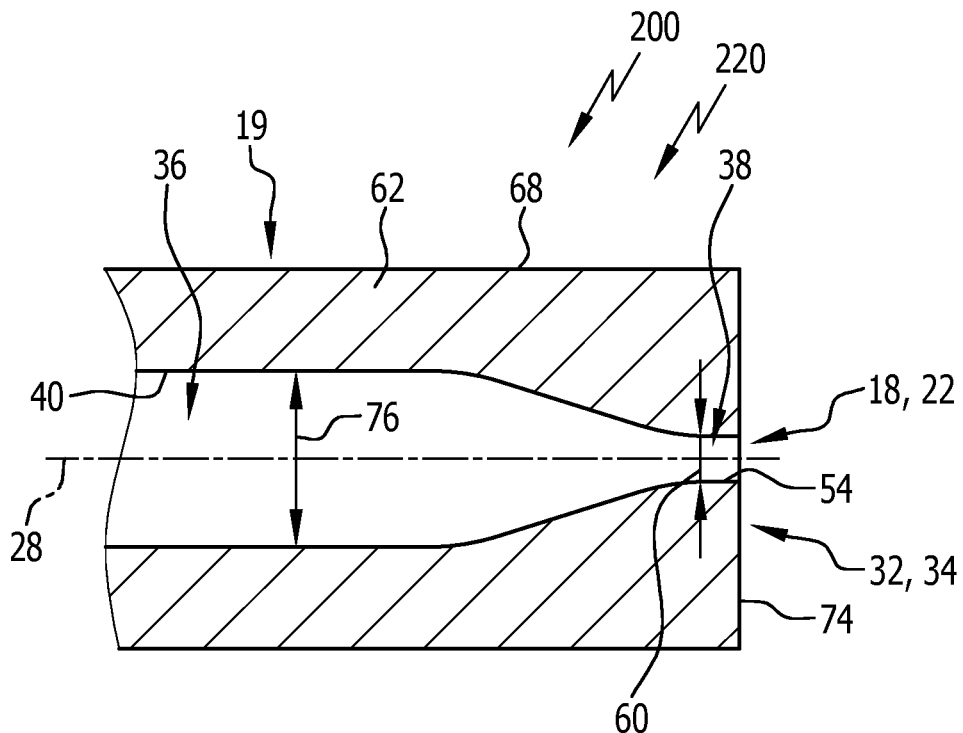
FIG. 4: shows an enlarged depiction, corresponding to FIG. 2, of a further embodiment of the high pressure tool in accordance with the invention.

The embodiment of the high pressure tool partially depicted in FIG. 4 and denoted with the reference numeral 200, which embodiment also forms a high pressure lance 220, differs from the embodiment of the high pressure tool 100 depicted in FIG. 3 substantially in that the high pressure tool 200 comprises only one single flow channel outlet 18, which is arranged on the end face 74 of the nozzle body 19.

The flow channel 14 of the high pressure tool 400 is arranged entirely coaxially to the longitudinal axis 28 of the base body 12. A fluid jet of a pressurized fluid, the jet direction of which is arranged substantially in parallel to the longitudinal axis 28 of the base body 12, can thus preferably be generated in the operation of the high pressure tool 400.

The internal diameter 60 of the outlet opening 54 is preferably smaller than an internal diameter 76 of the inlet opening 40, such that a hydraulic cross section of the flow channel 14 decreases toward the cleaning tip 32 or to the free end 34.

A transition from the inlet opening 40 to the outlet opening 54 is preferably continuous, in particular with a continuous tangent.

In all other respects, the embodiment of the high pressure tool 200 depicted in FIG. 4 corresponds with the embodiment of the high pressure tool 100 depicted in FIG. 3, such that reference is made to the preceding description thereof in that regard.

Figure 5:
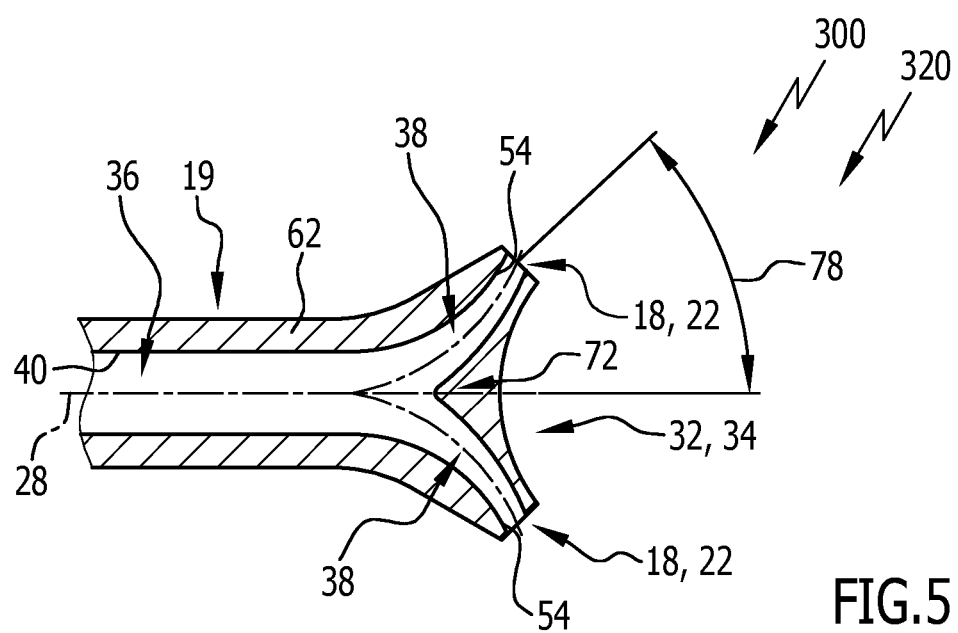
FIG. 5: shows an enlarged depiction, corresponding to FIG. 2, of a further embodiment of the high pressure tool in accordance with the invention.

The embodiment of the high pressure tool partially depicted in FIG. 5 and denoted with the reference numeral 300, which embodiment also forms a high pressure lance 320, differs from the embodiment of the high pressure tool 100 depicted in FIG. 3 substantially in that the nozzle channels 38 are entirely of curved configuration.

A "leading" fluid jet of a pressurized fluid can preferably be produced in this case as a well. The fluid jet is preferably widened as a result of the curvature of the nozzle channels.

For example, provision may be made that a fluid jet can be generated, which exits a respective nozzle channel 38 at an angle 78 in the range of about 10° to about 80°, in particular at an angle 78 of about 40° to about 70°, for example at an angle 78 of about 55°, to the longitudinal axis 28 of the base body 12.

In all other respects, the embodiment of the high pressure tool 300 depicted in FIG. 5 corresponds with the embodiment of the high pressure tool 100 depicted in FIG. 3, such that reference is made to the preceding description thereof in that regard.

Figure 6:
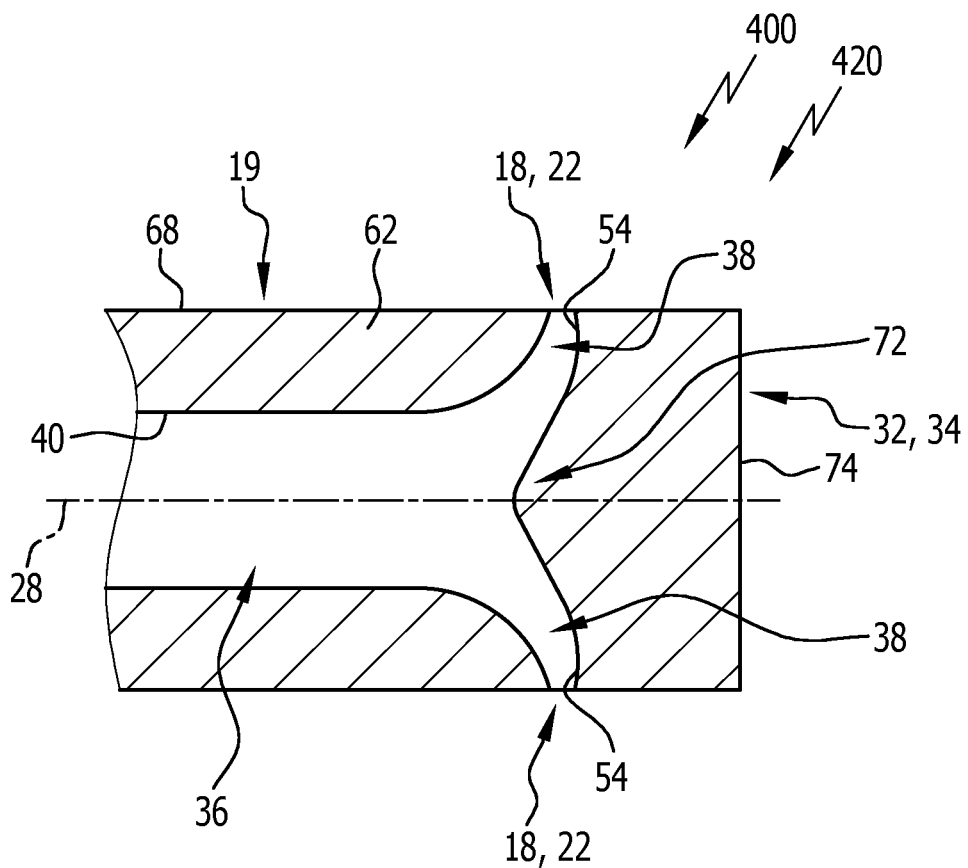
FIG. 6: shows an enlarged depiction, corresponding to FIG. 2, of a further embodiment of the high pressure tool in accordance with the invention.

The embodiment of the high pressure tool partially depicted in FIG. 6 and denoted with the reference numeral 400, which embodiment also forms a high pressure lance 420, differs from the embodiment of the high pressure tool 10 depicted in FIGS. 1 and 2 substantially in that in the operation of the high pressure tool 400, a fluid jet of a pressurized fluid can be generated, which exits a respective nozzle channel 38 on the lateral surface 68 of the nozzle body 19 with a jet direction extending at least approximately perpendicular to the longitudinal axis 28 of the base body 12.

The flow deflection element 72 of the high pressure tool 400 is preferably configured as a convexly curved projection, wherein a curvature of the projection toward the nozzle channels 38 transitions into a concave curvature.

In all other respects, the embodiment of the high pressure tool 400 depicted in FIG. 6 corresponds with the embodiment of the high pressure tool 10 depicted in FIGS. 1 and 2, such that reference is made to the preceding description thereof in that regard.

Figure 7:
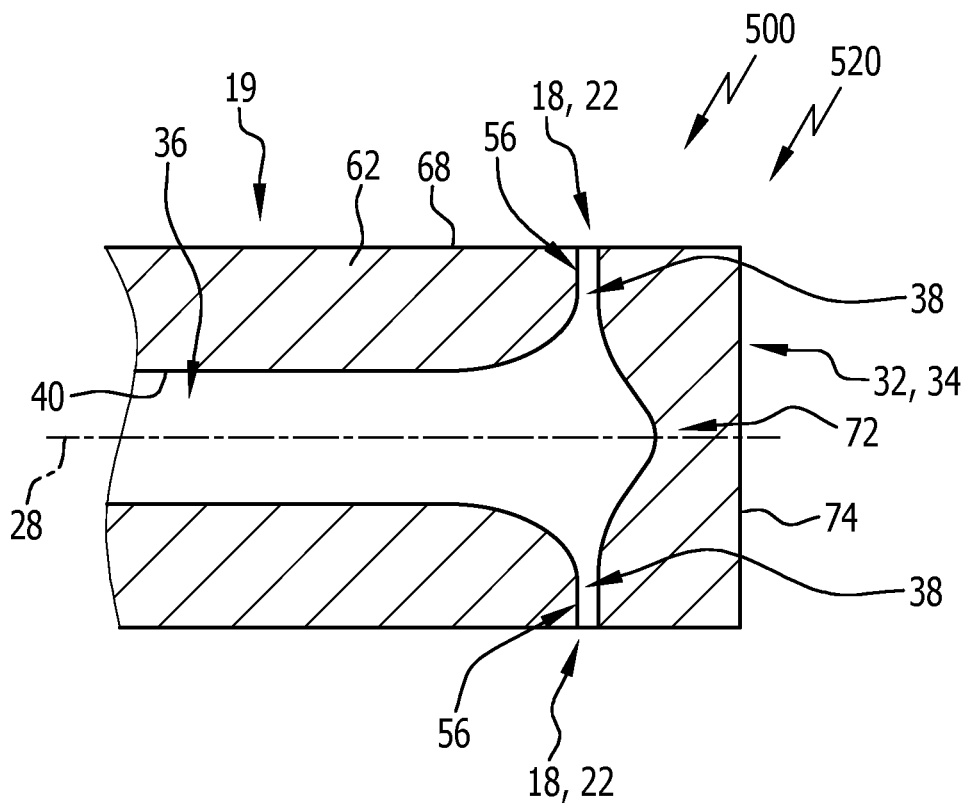
FIG. 7: shows an enlarged depiction, corresponding to FIG. 2, of a further embodiment of the high pressure tool in accordance with the invention.

The embodiment of the high pressure tool partially depicted in FIG. 7 and denoted with the reference numeral 500, which embodiment also forms a high pressure lance 520, differs from the embodiment of the high pressure tool 400 depicted in FIG. 6 substantially in that the flow deflection element 72 is configured as a concavely curved recess, wherein a curvature of the recess toward the nozzle channels 38 transitions into a convex curvature.

In contrast to the embodiment of the high pressure tool 400 depicted in FIG. 6, the outlet openings 54 of the embodiment of the high pressure tool 500 depicted in FIG. 7 further each comprise a cylindrical conducting portion 56.

In all other respects, the embodiment of the high pressure tool 500 depicted in FIG. 7 corresponds with the embodiment of the high pressure tool 400 depicted in FIG. 6, such that reference is made to the preceding description thereof in that regard.

Figure 8:
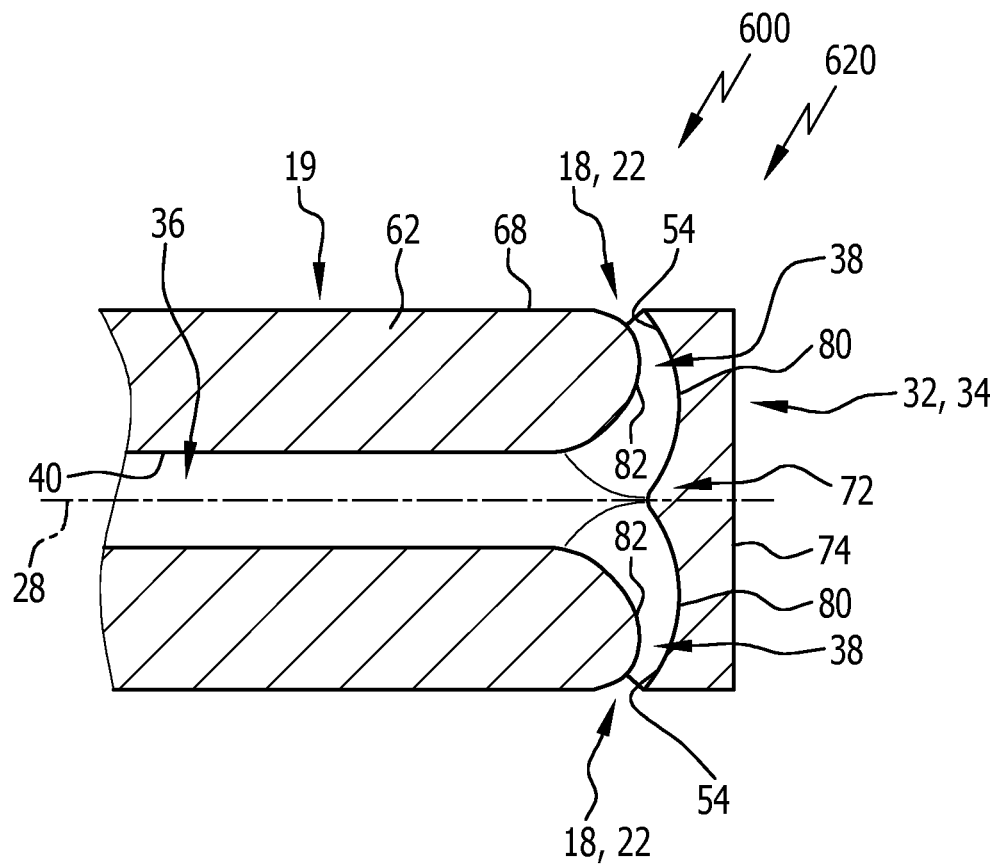
FIG. 8: shows an enlarged depiction, corresponding to FIG. 2, of a further embodiment of the high pressure tool in accordance with the invention.

The embodiment of the high pressure tool partially depicted in FIG. 8 and denoted with the reference numeral 600, which embodiment also forms a high pressure lance 620, differs from the embodiment of the high pressure tool 10 depicted in FIGS. 1 and 2 substantially in that two nozzle channels 38 are each delimited by wall portions of the nozzle body 19, which are each of curved configuration in a cross section of the nozzle body 19 taken through the longitudinal axis 28.

In particular, a nozzle channel 38 is delimited in each case by a wall portion 80 that is concave in cross section and a wall portion 82 that is convex in cross section.

In particular, provision may be made that the concave wall portion 80 is arranged closer to the free end 34 of the high pressure tool 600 in the direction of the longitudinal axis 12 than the convex wall portion 82, such that in the operation of the high pressure tool 600, a "rearwardly" directed or "lagging" fluid jet of pressurized fluid can be generated.

In particular, the nozzle channels 38 extend toward the lateral surface 68 of the nozzle body 19 in such a way that a jet angle of at least 90°, preferably of more than 90°, for example in a range of 90° to 120°, in relation to the longitudinal axis 28 of the base body 12 can be generated.

In all other respects, the embodiment of the high pressure tool 600 depicted in FIG. 8 corresponds with the embodiment of the high pressure tool 10 depicted in FIGS. 1 and 2, such that reference is made to the preceding description thereof in that regard.

The embodiment of the high pressure tool partially depicted in FIG. 9 and denoted with the reference numeral 700, which embodiment also forms a high pressure lance 720, differs from the embodiment of the high pressure tool 500 depicted in FIG. 7 substantially in that individual, a plurality of, or all transitions in the flow channel 14 are configured with a non-continuous tangent.

In particular, provision may be made that the nozzle channels 38 comprise a step-like cross sectional reduction 84, by means of which in the operation of the high pressure tool 700 turbulent flows in a pressurized fluid can preferably be generated. In particular, it is conceivable that the pressurized fluid can hereby be at least partially atomized. A cleaning effect and/or a deburring effect can preferably be improved by means of the atomized fluid.

The nozzle channels 38, in particular, branch off of the supply channel 36 perpendicularly. The flow deflection element 72 is configured as a circular cylindrical recess.

In the embodiment of the high pressure tool 700 depicted in FIG. 9, provision may further be made that mutually different outlet nozzles 22 are arranged on the nozzle body 19.

For example, it is conceivable that a nozzle channel 38 comprises an outlet funnel 70, whereas the other nozzle channel 38 comprises no outlet funnel 70.

In all other respects, the embodiment of the high pressure tool 700 depicted in FIG. 9 corresponds with the embodiment of the high pressure tool 500 depicted in FIG. 7, such that reference is made to the preceding description thereof in that regard.

The embodiment of the high pressure tool depicted in FIG. 10 and denoted with the reference numeral 800, which embodiment also forms a high pressure lance 820, differs from the embodiment of the high pressure tool 10 depicted in FIGS. 1 and 2 substantially in that additional structures 86 are arranged on the lateral surface 68 of the nozzle body 19, by means of which turbulence and/or cavitation can be generated in a pressurized fluid in a fluid space 88 formed between the high pressure tool 800 and a workpiece 11 to be cleaned and/or machined.

An improved cleaning and/or more effective deburring of the workpiece 11 to be machined can preferably be made possible by means of the additional structures 86.

For example, it is conceivable that the additional structures are configured as projections 90 extending in parallel to the longitudinal axis 12 and projecting away from the lateral surface 68 or as recesses 92 in the outside surface 68 that extend in parallel to the longitudinal axis 12.

The projections 90 and the recesses 92 may, for example, be of triangular, rectangular, or rounded configuration in a cross section taken perpendicularly to the longitudinal axis 12.

In all other respects, the embodiment of the high pressure tool 800 depicted in FIG. 10 corresponds with the embodiment of the high pressure tool 10 depicted in FIGS. 1 and 2, such that reference is made to the preceding description thereof in that regard.

It is conceivable that cross sections of the flow channel 14, in particular cross sections of the supply channel 36 and/or the nozzle channels 38 in all embodiments of the high pressure tool 10, 100, 200, 300, 400, 500, 600, 700, 800 may also deviate from a circular shape. The flow channel 14, in particular the supply channel 36 and/or the nozzle channels 38, may be, e.g., of oval, lenticular, rectangular, in particular square, triangular, or star-shaped configuration in cross section. In particular, provision may be made that the flow channel outlets 18 are of oval, lenticular, rectangular, in particular square, triangular, or star-shaped configuration.

It is further conceivable that an outer contour of a cross section taken perpendicularly to the longitudinal axis 28 of the base body 12 through the base body 12 and/or the nozzle body 19, in particular a cross section taken perpendicularly to the longitudinal axis 28 of the base body 12 through the insertion portion 30, deviates from a circular form in all embodiments of the high pressure tool 10, 100, 200, 300, 400, 500, 600, 700, 800. For example, it is conceivable that an outer contour of a cross section taken perpendicularly to the longitudinal axis 28 of the base body 12 through the base body 12 and/or the nozzle body 19, in particular a cross section taken perpendicularly to the longitudinal axis 28 of the base body 12 through the insertion portion 30, is oval or polygonal, for example rectangular or square.

It may further be favorable if the flow deflection element 72 in different embodiments of the high pressure tool 10, 100, 200, 300, 400, 500, 600, 700, 800 is configured as a projection or recess. A flow deflection element 72 configured as a projection may, for example, be spherical at least in sections. Further, it is conceivable that a flow deflection element 72 configured as a projection is of bell-shaped, conical, frustoconical, or cylindrical configuration.

A form of the outlet nozzles 22 and/or the nozzle channels 38, a cross section of the flow channel 14, a form of the flow deflection element 72 or a form or arrangement of additional structures 86 can hereby be combined with one another in any way in all embodiments of the high pressure tool 10, 100, 200, 300, 400, 500, 600, 700, 800. All theoretically possible combinations are not depicted merely for reasons of clarity.

Overall, in accordance with the invention, a high pressure tool 10, 100, 200, 300, 400, 500, 600, 700, 800 for industrially cleaning and/or machining workpieces by means of a pressurized fluid, with which high pressure tool an improved degree of efficiency can be achieved and which has an improved durability. Furthermore, in accordance with the invention, a method for producing such a high pressure tool 10, 100, 200, 300, 400, 500, 600, 700, 800 can be provided, by means of which the high pressure tool 10, 100, 200, 300, 400, 500, 600, 700, 800 is producible in a simple and cost-effective manner.

REFERENCE NUMERALS 10 high pressure tool
11 workpiece
12 base body
14 flow channel
16 flow channel inlet
17 length
18 flow channel outlet
19 nozzle body
20 high pressure lance
21 connecting region
22 outlet nozzle
24 fastening portion
26 fastening flange
28 longitudinal axis
30 insertion portion
31 recess
32 cleaning tip
34 free end
36 supply channel
38 nozzle channel
40 inlet opening
42 first region
44 first internal diameter
46 second region
48 second internal diameter
50 transition region
51 length
52 dashed line
53 inlet cone
54 outlet opening
56 conducting portion
58 length
60 internal diameter
61 3D printer
62 base material
64 longitudinal axis
66 angle
68 lateral surface
70 outlet funnel
72 flow deflection element
74 end face
76 internal diameter
78 angle
80 concave wall portion
82 convex wall portion
84 cross sectional reduction
86 additional structure
88 fluid space
90 projection
92 recess
100 high pressure tool
120 high pressure lance
200 high pressure tool
220 high pressure lance
300 high pressure tool
320 high pressure lance
400 high pressure tool
420 high pressure lance
500 high pressure tool
520 high pressure lance
600 high pressure tool
620 high pressure lance
700 high pressure tool
720 high pressure lance
800 high pressure tool
820 high pressure lance

What is claimed is:

1. High pressure tool for at least one of industrially cleaning and machining workpieces by a pressurized fluid, wherein the high pressure tool comprises the following:
a base body and a flow channel extending between a flow channel inlet and at least one flow channel outlet, wherein
the high pressure tool further comprises a nozzle body formed in one piece, on which the at least one flow channel outlet is arranged and through which the flow channel at least partially extends, wherein the base body comprises or forms the nozzle body or wherein the base body is connected or connectable to the nozzle body, wherein arranged or formed on at least one of a lateral surface of the nozzle body and the base body are additional structures for generating at least one of turbulence and cavitation in the pressurized fluid; and wherein the additional structures are configured as or comprise projections extending in parallel to a longitudinal axis of the base body and projecting away from a lateral surface of the nozzle body or are configured as or comprise recesses in the lateral surface of the nozzle body extending in parallel to the longitudinal axis of the base body.

2. High pressure tool in accordance with claim 1, wherein at least one of the nozzle body and the base body is formed as one material piece.

3. High pressure tool in accordance with claim 1, wherein the base body is connected or connectable to the nozzle body by at least one of the following:
   force fit;
   positive engagement;
   material bond;
   screw connection;
   welding; and
   soldering.

4. High pressure tool in accordance with claim 1, wherein at least one of the nozzle body and the base body of the high pressure tool are producible or produced by an additive manufacturing process.

5. High pressure tool in accordance with claim 1, wherein the flow channel comprises a supply channel and at least one nozzle channel, which branches off of the supply channel and is arranged obliquely to the supply channel.

6. High pressure tool in accordance with claim 5, wherein the at least one nozzle channel is formed by an outlet opening, comprising a cylindrical conducting portion, wherein a length of the conducting portion is greater than an internal diameter of the outlet opening in the conducting portion.

7. High pressure tool in accordance with claim 6, wherein the conducting portion is of circular cylindrical configuration, curved or arcuate.

8. High pressure tool in accordance with claim 5, wherein the supply channel is formed by an inlet opening, and wherein a longitudinal axis of the outlet opening is aligned at an angle relative to a longitudinal axis of the inlet opening, the angle being from about 10° to about 140°.

9. High pressure tool in accordance with claim 1, wherein at least one flow channel outlet is arranged on a lateral surface of the nozzle body, and wherein individual, a plurality of, or all flow channel outlets are arranged axisymmetrically to a longitudinal axis of the base body or asymmetrically on the lateral surface of the nozzle body.

10. High pressure tool in accordance with claim 1, wherein at least one flow channel outlet is arranged on an end face of the nozzle body, and wherein individual, a plurality of, or all flow channel outlets are arranged axisymmetrically to a longitudinal axis of the base body or asymmetrically on the end face of the nozzle body.

11. High pressure tool in accordance with claim 1, wherein the nozzle body comprises a flow deflection element, which is arranged coaxially to a longitudinal axis of the base body and is arranged in the flow channel.

12. High pressure tool in accordance with claim 11, wherein the flow deflection element is a projection that projects counter to a flow direction of the fluid in parallel to the longitudinal axis of the base body or is a recess.

13. High pressure tool in accordance with claim 11, wherein the flow deflection element is configured to widen in a wedge-shaped manner in the flow direction of the fluid.

14. High pressure tool in accordance with claim 11, wherein the projection is of bell-shaped, conical, frustoconical, or cylindrical configuration.

15. High pressure tool in accordance with claim 11, wherein a transition from the supply channel to the at least one nozzle channel is configured such that a cross section of the flow channel is not reduced by a flow deflection element configured as a projection.

16. High pressure tool in accordance with claim 1, wherein the base body of the high pressure tool is formed substantially rotationally symmetrical to a longitudinal axis of the base body.

17. High pressure tool in accordance with claim 1, wherein the base body and the nozzle body are configured as one material piece with one another.

18. Method for producing a high pressure tool for at least one of industrially cleaning and machining workpieces by a pressurized fluid, wherein the high pressure tool comprises a base body and a flow channel extending between a flow channel inlet and at least one flow channel outlet, wherein the method comprises the following:
   producing a nozzle body of the high pressure tool, wherein the nozzle body is produced in one piece by an additive manufacturing process, such that the at least one flow channel outlet is arranged on the nozzle body and the flow channel extends at least partially through the nozzle body;
   producing the base body and the nozzle body in one piece in the additive manufacturing process or connecting the base body to the nozzle body;
   wherein arranged or formed on at least one of a lateral surface of the nozzle body and the base body are additional structures for generating at least one of turbulence and cavitation in the pressurized fluid and
   wherein the additional structures are configured as or comprise projections extending in parallel to a longitudinal axis of the base body and projecting away from a lateral surface of the nozzle body or are configured as or comprise recesses in the lateral surface of the nozzle body extending in parallel to the longitudinal axis of the base body.

19. Method in accordance with claim 18, wherein at least one of the nozzle body and the base body of the high pressure tool are produced by 3D printing.

20. Method in accordance with claim 18, wherein the base body and the nozzle body are configured as one material piece with one another.

21. High pressure tool for at least one of industrially cleaning and machining workpieces by a pressurized fluid, wherein the high pressure tool comprises the following:
   a base body and a flow channel extending between a flow channel inlet and at least one flow channel outlet,
   wherein
   the high pressure tool further comprises a nozzle body formed in one piece, on which the at least one flow channel outlet is arranged and through which the flow channel at least partially extends, wherein the base body comprises or forms the nozzle body or wherein the base body is connected or connectable to the nozzle body, wherein the nozzle body comprises a flow deflection element, which is arranged coaxially to a longitudinal axis of the base body and is arranged in the flow channel, and wherein a transition from the supply channel to the at least one nozzle channel is configured such that a cross section of the flow channel is not reduced by a flow deflection element configured as a projection.

22. Method for producing a high pressure tool for at least one of industrially cleaning and machining workpieces by a pressurized fluid, wherein the high pressure tool comprises a base body and a flow channel extending between a flow channel inlet and at least one flow channel outlet, wherein the method comprises the following:

producing a nozzle body of the high pressure tool, wherein the nozzle body is produced in one piece by an additive manufacturing process, such that the at least one flow channel outlet is arranged on the nozzle body and the flow channel extends at least partially through the nozzle body;

producing the base body and the nozzle body in one piece in the additive manufacturing process or connecting the base body to the nozzle body;

wherein the nozzle body comprises a flow deflection element, which is arranged coaxially to a longitudinal axis of the base body and is arranged in the flow channel, and wherein a transition from the supply channel to the at least one nozzle channel is configured such that a cross section of the flow channel is not reduced by a flow deflection element configured as a projection.

* * * * *